E. DOR-DELATTRE.
MEANS FOR CHARGING THE RETORTS OF ZINC AND OTHER ANALOGOUS FURNACES.
APPLICATION FILED JULY 1, 1908.

914,339.

Patented Mar. 2, 1909.

UNITED STATES PATENT OFFICE.

EMILE DOR-DELATTRE, OF LIEGE, BELGIUM.

MEANS FOR CHARGING THE RETORTS OF ZINC AND OTHER ANALOGOUS FURNACES.

No. 914,339.　　　　Specification of Letters Patent.　　　Patented March 2, 1909.

Application filed July 1, 1908. Serial No. 441,481.

*To all whom it may concern:*

Be it known that I, EMILE DOR-DELATTRE, subject of the King of Belgium, residing at Liege, Belgium, have invented certain new and useful Improvements in Means for Charging the Retorts of Zinc and other Analogous Furnaces; and I do hereby declare the following to be a full, clear, and exact description of the invention.

The charging of retorts of furnaces in which coal gas is produced, and of those in which the reduction of zinc-ores is effected, is an expensive operation and is very fatiguing to the operator. As the duration and the regularity of these chargings has a very great influence upon the output, charging by hand has been previously attempted to be replaced by mechanical charging. A number of these appliances having this object are based upon the principle of the blade-fan, or paddle-wheel.

The present invention relates to an apparatus of this type, arranged so that the charging tube can be brought very near to the ground and rapidly take, without any complicated mechanism, different inclinations. The paddle or conveyer wheel, having a rotatory movement and entering into and throwing-up the material to be charged, is arranged so that this material is, as much as possible, isolated from the walls of the casing around the wheel so as to reduce the wear to a minimum.

The accompanying drawing represents an apparatus of this type.

Figure 1:
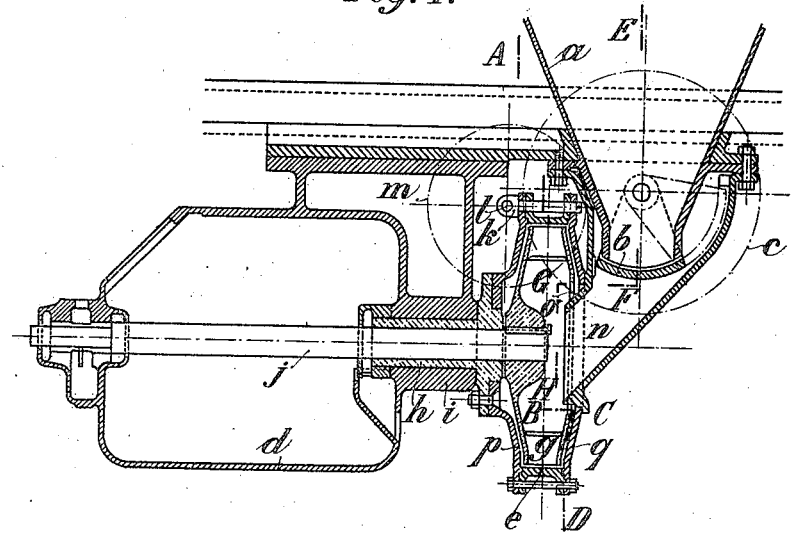
Figure 3:
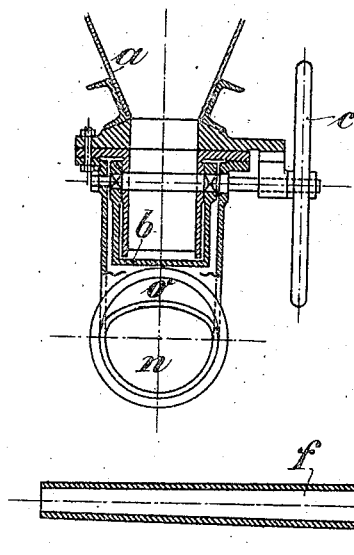
Figure 2:
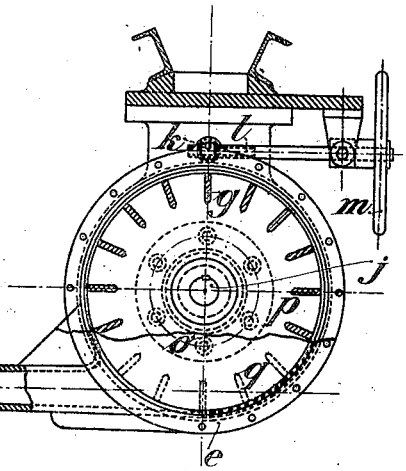

Figure 1 is a longitudinal section. Fig. 2 is a transverse section on A—B—C—D. Fig. 3 is a section on E—F—G—H (Fig. 1).

The apparatus consists essentially of a hopper *a* provided with a valve or damper *b* operated by the hand-wheel *c*, and intended to receive the materials to be charged; an electric motor *d* suspended from the hopper *a*; a casing *e* carrying the charging tube *f*; and the paddle or conveyer wheel *g*.

The casing *e* is connected to the framing of the electric motor *d* through the medium of the hollow shaft *h*, which is capable of turning within the fixed bearing *i* and through which passes the shaft *j* of the wheel *g* driven by the motor *d*.

The casing *e*, carrying the charging tube *f*, carries at its upper end the pivot pin of an internally screwed eye *k* through which passes the screw *l*, which can be rotated by the hand wheel *m*. This screw *l* is supported near its outer end by the fixed part of the apparatus, and in such a manner that it can be inclined to the horizontal without longitudinal displacement.

The paddle or conveyer wheel *g* is formed by the two disks *p* and *q* connected together by the short projecting blades *g*. The disk *p* is fixed on the shaft *j* of the motor *d*, while the disk *q* has a circular opening *o* which receives the end of the feed channel *n*. These disks *p* and *q* are inclined toward one another from the center to the periphery, so as to leave between them, at the center, a considerable space, for the purpose of facilitating the entrance of the material.

The hopper *a* is fixed to a traveling crane which can raise or lower it at will. This traveling crane being capable itself of being moved in front of the furnace the charging tube *f* can be brought before each retort to be charged, even those in the lower row.

After having filled the hopper *a* with the material to be charged, the electric motor *d* is started, and runs continuously without stopping throughout the whole of the time the furnace is being charged. By the aid of the traveling crane, the tube *f* is brought in front of the retort to be charged and, by operating the screw *l*, this tube is made to take the same inclination as that of the row of retorts which is being charged. The operator then opens the valve or damper *b*; the material quickly falls, and leaving by the channel *n* extending into the space between the disks *p* and *q*, falls between the blades *g* which throw it violently through the tube *f* into the retort being charged, without the material being thrown against the walls *e* of the casing. When the retort is filled, the operator quickly closes the valve *b* which instantly stops the further projection of the material.

From the above it follows that this apparatus can serve for charging the retorts of all zinc furnaces, while, owing to the method of suspension, the charging tube *f* can take any inclination required, and can reach the lowest row of retorts, which are in certain cases very near the ground.

The arrangement of the hopper *a*, the channel *n* and valve *b* permit of dispensing with a mechanical feed apparatus, and allows of rapidly starting or stopping the charging of the material.

The employment of the two disks $p$ and $q$ turning at a great speed and connected together by the blades $g$, prevents the material from being carried against the walls of the casing $e$, and, in consequence, the wear of these walls is obviated. Moreover jamming of the material when the grinding has been defective, is also obviated. The suppression of this friction, effected by the employment of the two disks $p$ and $q$, also effects a great saving in motive power.

In order to obviate as much as possible the friction of the ore on the blades, which it corrodes very rapidly, these blades only extend for a very short length of the radius of the wheel, which prevents the material being carried away by the rotation of the wheel immediately on entering. Owing to this new arrangement of the blades, the action of centrifugal force is nearly completely obviated, as the material arrives, by gravity, at the periphery of the wheel, from where it is then thrown outward.

Having fully described my invention, what I desire to claim and secure by Letters Patent is:—

1. In an apparatus for charging the retorts of zinc or similar furnaces, the combination of a hopper, a conveyer comprising two rotary disks connected by a series of blades adjacent their peripheries, a conduit extending from the hopper through a central opening in one of the conveyer disks, and a delivery chute adapted to receive material discharged by the conveyer.

2. In an apparatus for charging the retorts of zinc or similar furnaces, the combination of a hopper, a motor, a conveyer comprising two rotary disks connected by a series of blades adjacent their peripheries, one of said disks being connected with the shaft of the motor, a casing surrounding the conveyer, a delivery chute communicating with the casing, and a conduit extending from the hopper through openings in the casing and one of the disks of the conveyer.

3. In an apparatus for charging the retorts of zinc or similar furnaces, the combination of a hopper, a conveyer comprising two rotary disks, and a series of blades extending across the space between and connecting said disks at their peripheries, the distance between the peripheries of the disks being less than that between the disks nearer their centers, a delivery chute adapted to receive material discharged by the conveyer, and means for conducting material from the hopper to said support.

4. In an apparatus for charging the retorts of zinc or similar furnaces, the combination of a hopper, a discharge chute mounted to vibrate about a horizontal axis, means for forcing material through said chute, and means for conveying material from the hopper to said forcing means.

5. In an apparatus for charging the retorts of zinc or similar furnaces, the combination of a hopper, a conveyer wheel, a casing inclosing said wheel and mounted to be adjusted about the axis thereof, a discharge chute connected with the casing, means for rotating the wheel, and means for supplying material from the hopper to the interior of said casing.

6. In an apparatus for charging the retorts of zinc or similar furnaces, the combination of a conveyer comprising a chute and means for forcing material therefrom, means for adjusting the conveyer about a horizontal axis to vary the elevation of the discharge end of the chute, and means for supplying material to the conveyer.

In testimony whereof I affix my signature in presence of two witnesses.

EMILE DOR-DELATTRE.

Witnesses:
  A. NARIEBER,
  ED SEFULDEN.